(12) United States Patent
Velusamy

(10) Patent No.: US 9,194,938 B2
(45) Date of Patent: Nov. 24, 2015

(54) TIME DIFFERENCE OF ARRIVAL DETERMINATION WITH DIRECT SOUND

(75) Inventor: Kavitha Velusamy, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 586 days.

(21) Appl. No.: 13/168,759

(22) Filed: Jun. 24, 2011

(65) Prior Publication Data
US 2012/0327746 A1   Dec. 27, 2012

(51) Int. Cl.
*G01S 5/00* (2006.01)
*G01S 5/22* (2006.01)
*G01S 3/86* (2006.01)

(52) U.S. Cl.
CPC .... *G01S 5/22* (2013.01); *G01S 3/86* (2013.01)

(58) Field of Classification Search
CPC ..................................... G01S 3/86; G01S 5/22
See application file for complete search history.

(56) References Cited

U.S. PATENT DOCUMENTS

| | | | |
|---|---|---|---|
| 5,973,998 A | 10/1999 | Showen et al. | |
| 6,414,690 B1 | 7/2002 | Balasubramanian et al. | |
| 6,414,960 B1 | 7/2002 | Kuhn et al. | |
| 7,285,690 B2 | 10/2007 | Rao et al. | |
| 7,285,960 B2 | 10/2007 | Koch et al. | |
| 7,418,392 B1 | 8/2008 | Mozer et al. | |
| 7,720,683 B1 | 5/2010 | Vermeulen et al. | |
| 7,774,204 B2 | 8/2010 | Mozer et al. | |
| 2003/0033150 A1 | 2/2003 | Balan et al. | |
| 2004/0037436 A1* | 2/2004 | Rui | 381/92 |
| 2005/0249360 A1 | 11/2005 | Adcock et al. | |
| 2006/0239471 A1* | 10/2006 | Mao et al. | 381/92 |
| 2008/0037370 A1* | 2/2008 | Crowell | 367/127 |
| 2009/0251996 A1* | 10/2009 | Dijk | 367/127 |
| 2009/0279714 A1 | 11/2009 | Kim et al. | |
| 2010/0228530 A1* | 9/2010 | Valero et al. | 703/2 |
| 2011/0064240 A1* | 3/2011 | Litvak et al. | 381/94.1 |
| 2012/0223885 A1 | 9/2012 | Perez | |

FOREIGN PATENT DOCUMENTS

| | | |
|---|---|---|
| JP | 2005323381 | 11/2005 |
| JP | 2005535022 | 11/2005 |
| JP | 2007528496 | 10/2007 |
| WO | WO2011088053 A2 | 7/2011 |

OTHER PUBLICATIONS

Chen, et al., "Time Delay Estimation in Room Acoustic Environments: An Overview", EURASIP Journal on Applied Signal Processing, Barcelona, Spain, vol. 2006, Article ID 26503, 2006, pp. 1-19.

(Continued)

*Primary Examiner* — Isam Alsomiri
*Assistant Examiner* — Hovhannes Baghdasaryan
(74) *Attorney, Agent, or Firm* — Lee & Hayes, PLLC

(57) ABSTRACT

Acoustic signals may be localized such that their position in space is determined. Time-difference-of-arrival data from multiple microphones may be used for this localization. Signal data from the microphones may be degraded by reverberation and other environmental distortions, resulting in erroneous localization. By detecting a portion of the signal resulting from sound directly reaching a microphone rather than from a reverberation, accuracy of the localization is improved.

47 Claims, 8 Drawing Sheets

(56) References Cited

OTHER PUBLICATIONS

PCT Search Report mailed Aug. 31, 2012 for PCT application No. PCT/US12/43817, 12 pages.
Pinhanez, "The Everywhere Displays Projector: A Device to Create Ubiquitous Graphical Interfaces", IBM Thomas Watson Research Center, Ubicomp 2001, 18 pages.
Bechler, et al., "Three Different Reliability Criteria for Time Delay Estimates", Proceedings of the European Signal Processing Conference, vol. 12, Sep. 6, 2004, pp. 1987-1990.
Extended European Search Report mailed Feb. 17, 2015 for European Patent Application No. 12802077.3, 10 pages.
Huang, et al., "A Biomimetic System for Localization and Separation of Multiple Sound Sources", IEEE Transactions on Instrumentation and Measurement, vol. 44, No. 3, Jun. 1995, pp. 733-738.
Huang, et al., "Sound Localization in Reverberant Environment Based on the Model of the Precedence Effect", IEEE Transactions on Instrumentation and Measurement, vol. 46, No. 4, Aug. 1997, pp. 842-846.
Translated Japanese Office Action mailed Jan. 6, 2015 for Japanese patent application No. 2014-517218, a counterpart foreign application of U.S. Appl. No. 13/168,759, 6 pages.

* cited by examiner

TIME DIFFERENCE OF ARRIVAL DETERMINATION WITH DIRECT SOUND

BACKGROUND

Acoustic signals such as handclaps or fingersnaps may be used as input within augmented reality environments. In some instances, systems and techniques may attempt to determine the location of these acoustic signals within these environments. Traditional methods of localizing, or determining the spatial coordinates, of an acoustic source are sensitive to distortions introduced by the environment and frequently produce erroneous results. What is desired is a way to effectively and accurately determine the spatial coordinates of an acoustic signal.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
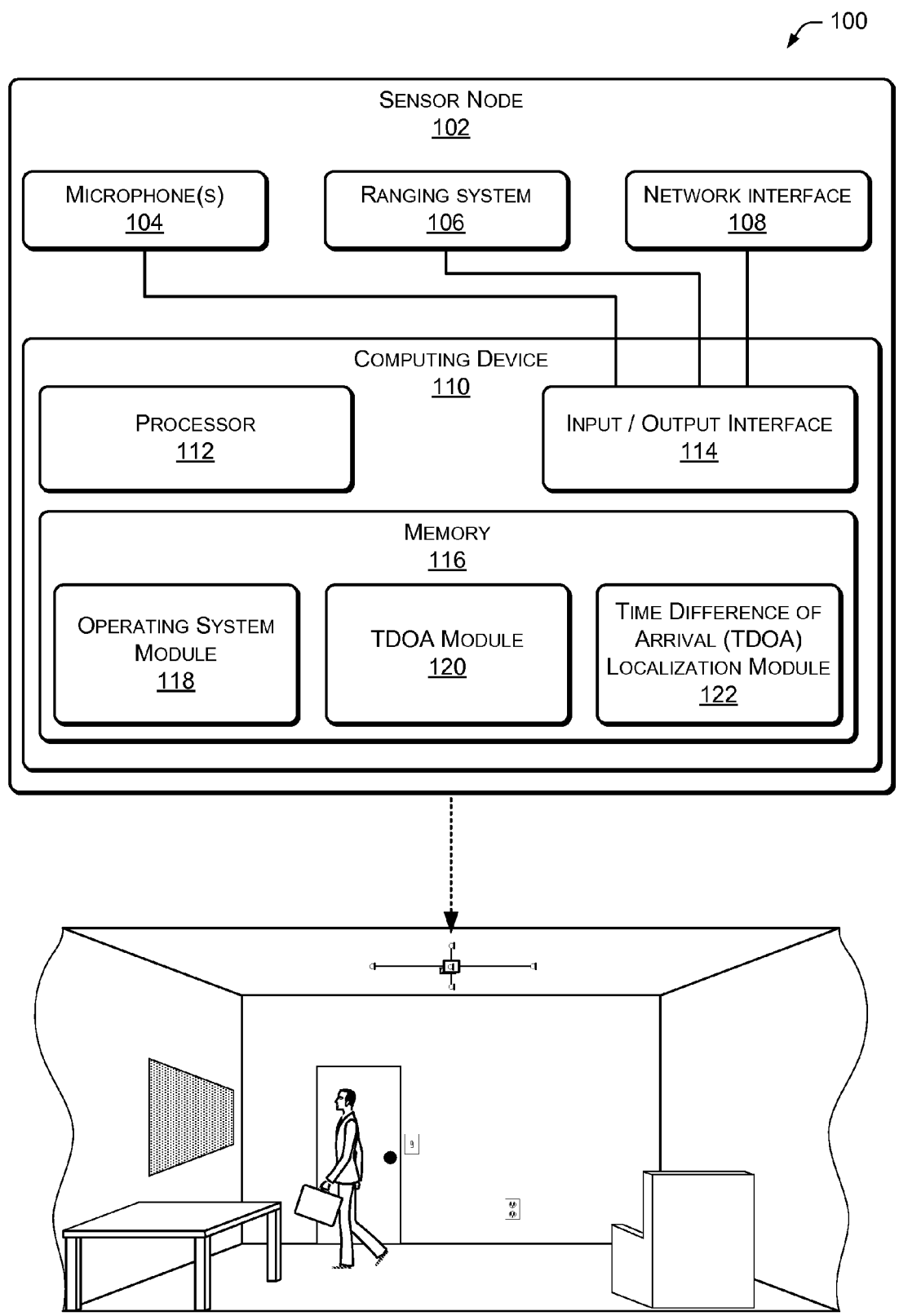
FIG. 1 shows an illustrative scene with a sensor node configured to determine spatial coordinates of an acoustic signal which is deployed in an example room, which may comprise an augmented reality environment as described herein.

Augmented reality environments may utilize acoustic signals such as audible gestures, human speech, audible interactions with objects in the physical environment, and so forth for input. Detection of these acoustic signals provides for minimal input, but richer input modes are possible where the acoustic signals may be localized, or located in space. For example, a handclap at chest height may be ignored as applause while a handclap over the user's head may call for execution of a special function. In another example, a person speaking while standing may be given priority for speech recognition over a person seated while speaking. In one example, the localization may be of acoustic signals propagated through a medium having a density less than 1000 kilograms per cubic meter. For example, gaseous air at about one standard atmosphere of pressure (about 100 kilopascals).

A plurality of microphones may be used to detect an acoustic signal. By measuring the time of arrival of the acoustic signal at each of the microphones, and given a known position of each microphone relative to one another, time-difference-of-arrival data is generated. This time-difference-of-arrival (TDOA) data may be used for hyperbolic positioning to calculate the location of the acoustic signal. The acoustic environment, particularly with audible frequencies (including those extending from about 300 Hz to about 3 KHz), are signal and noise rich. Furthermore, acoustic signals interact with various objects in the physical environment, including users, furnishings, walls, and so forth. This interaction can result in direct sound as well as indirect sounds. Direct sound is sound which travels directly from the acoustic source to a sensing microphone, free from obstruction or interaction with other objects or surfaces. Indirect sounds, in contrast, travel via one or more indirect routes, such as via reflection, refraction, and so forth. Indirect sounds such as reverberations may manifest as a series of echoes of the direct signal, received over a relatively short span of time.

Generally, a path length between the acoustic source and the sensor is longer for indirect sounds than for direct sounds. Stated another way, direct sounds generally travel a shorter distance from the source to the sensor. Given a reasonably homogenous medium for transfer of the signal, the longer path length results in more time taken by the indirect sound to transit from the source to the sensor, compared to the direct sound. Given the importance of accurate time differentials in hyperbolic positioning, such variances in timing may lead to significant errors in a calculated position. The presence of multiple similar signals such as in the case of reverberation may thus cause significant variance in the calculated time delay and corresponding introduction of errors in calculated location.

Disclosed herein are devices and techniques for generating time-difference-of-arrival (TDOA) data suitable for use in determining location of a signal source within an environment that may cause signal reverberation. Within such an environment, microphones that acquire signals from an acoustic source are disposed in a pre-determined physical arrangement having relative locations to one another which are known. In this regard, an origin point may be specified relative to the microphones. The spatial coordinates of the acoustic signal may then be defined relative to the origin. A time-difference-TDOA module is configured to generate from the signals a set of time delays suitable for use by a TDOA localization module in determining spatial coordinates of the acoustic signal.

As described herein, the TDOA module is configured to process audio signals to determine direct sounds emanating from the acoustic source, and provide time-difference-of-arrival delay intervals. The TDOA module is configured to look for direct sound components of the signals and disregard reverberations, echoes, and so forth. A portion of the signal may be used to determine the direct sound. For example, a first two milliseconds of an event of interest may be used to determine whether the signal is a direct or indirect sound.

In some implementations, known physical attributes may be used to constrain or filter possible TDOA results. Physical attributes may include spacing and positioning of microphones, room dimensions, and so forth. For example, where the microphone spacing is known, TDOA results which would result in a sound exceeding the speed of sound when travelling between the two microphones may be disregarded.

ILLUSTRATIVE ENVIRONMENT

FIG. 1 shows an illustrative scene 100 of a room with a sensor node 102. The sensor node 102 is configured to determine spatial coordinates of an acoustic signal in the room, such as may be used in an augmented reality environment. The sensor node 102 may be located at various locations around the room, such as on the ceiling, on a wall, on a table, floor mounted, and so forth.

As shown here, the sensor node 102 incorporates or is coupled to a plurality of microphones 104 configured to receive acoustic signals. A ranging system 106 may also be present which provides another method of measuring the distance to objects within the room. The ranging system 106 may comprise laser range finder, acoustic range finder, optical range finder, structured light module, and so forth. The structured light module may comprise a structured light source and camera configured to determine position, topography, or other physical characteristics of the environment or objects therein based at least in part upon the interaction of structured light from the structured light source and an image acquired by the camera.

A network interface 108 may be configured to couple the sensor node 102 with other devices placed locally such as within the same room, on a local network such as within the same house or business, or remote resources such as accessed via the internet. In some implementations, components of the sensor node 102 may be distributed throughout the room and configured to communicate with one another via cabled or wireless connection.

The sensor node 102 may include a computing device 110. The computing device 110 may comprise one or more processors 112, one or more input/output interfaces 114, and a memory 116. The memory 116 may store an operating system 118, time-difference-of-arrival (TDOA) module 120, and TDOA localization module 122. In some implementations, the resources among a plurality of computing devices 110 may be shared. These resources may include input/output devices, processors 112, memory 116, and so forth. The memory 116 may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by a computing device.

The input/output interface 114 may be configured to couple the computing device 110 to microphones 104, ranging system 106, network interface 108, or other devices such as an atmospheric pressure sensor, temperature sensor, hygrometer, barometer, an image projector, camera, and so forth. The coupling between the computing device 110 and the external devices such as the microphones 104 and the network interface 108 may be via wire, fiber optic cable, wirelessly, and so forth.

The TDOA module 120 is configured to determine time-difference-of-arrival delay values using direct sound acoustic signals received by the microphones 104. In some implementations the TDOA module 120 may be configured to accept data from the sensors accessible to the input/output interface 114. For example, the TDOA module 120 may determine time-difference-of-arrival based at least in part upon temperature and humidity data. As described below in more detail with regards to FIG. 6-8, the TODA module 120 is configured to accept signal inputs and determine TDOA delays associated with the original source of the acoustic signals. The use of the direct sounds minimizes errors due to reverberation within the room for more accurate localization.

Once available by the TDOA module 120, the TDOA localization module 122 is configured to use the TDOA data to determine source locations of the acoustic signals. This determination may include hyperbolic positioning based on the TDOA data and known positions of the microphones.

Figure 2:
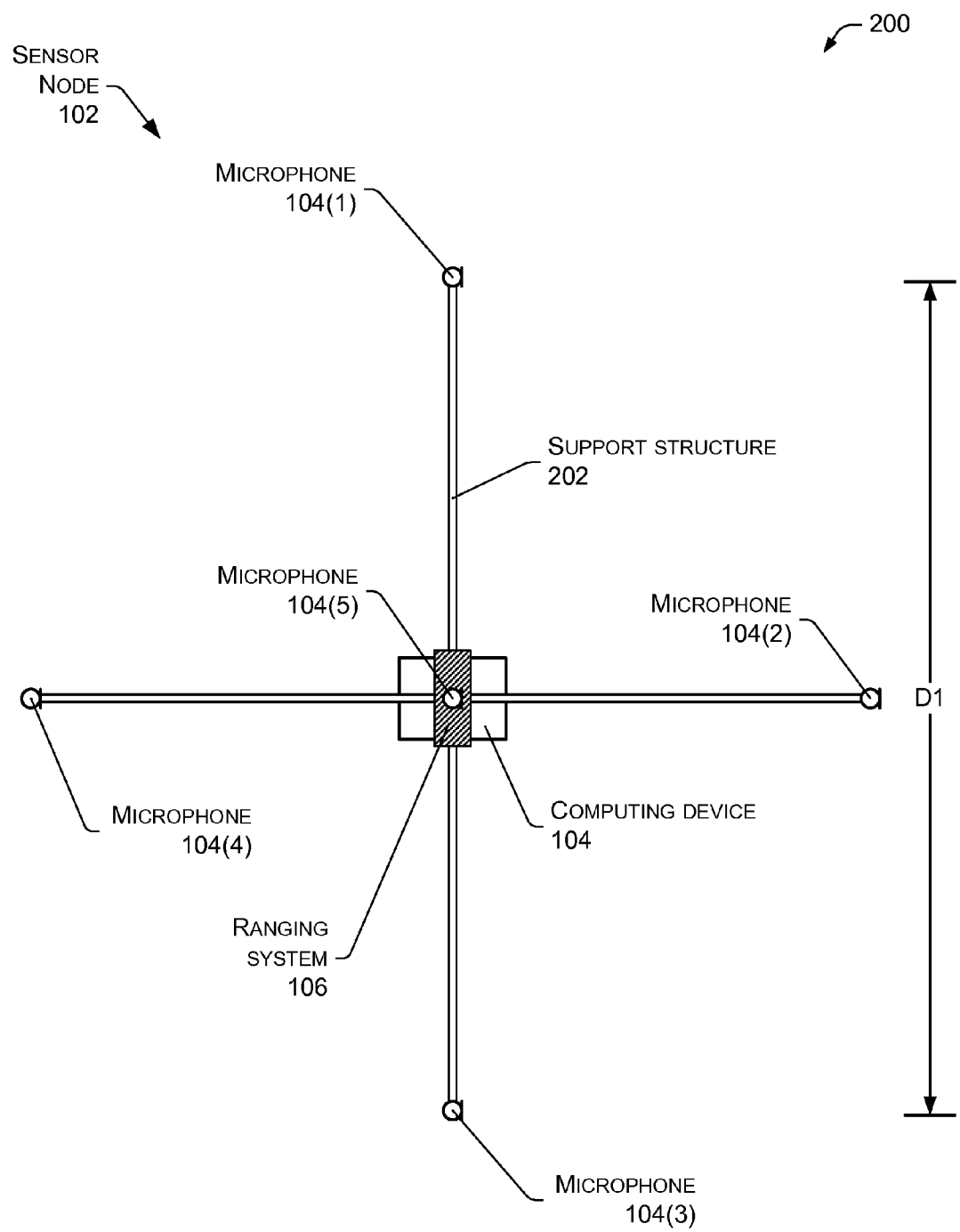
FIG. 2 shows an illustrative sensor node including a plurality of microphones deployed at pre-determined locations within the example room of FIG. 1.

FIG. 2 shows an illustration 200 of the sensor node 102. In this illustration a support structure 202 comprises a cross with two linear members disposed perpendicular to one another each having length of D1 and D2. The support structure 202 aids in maintaining a known pre-determined distance between the microphones which may then be used in the determination of the spatial coordinates of the acoustic signal. Five microphones 104(1)-(5) are disposed at the center of the cross as well as at the ends of each arm of the cross. It is understood that the number and placement of the microphones 104 as well as the shape of the support structure 202 may vary. For example, in other implementations the support structure may describe a triangular, circular, or another geometric shape. In some implementations an asymmetrical support structure shape, distribution of microphones, or both may be used.

The support structure 202 may comprise part of the structure of a room. For example, the microphones 104 may be mounted to the walls, ceilings, floor, and so forth at known locations within the room. In some implementations the microphones 104 may be emplaced, and their position relative to one another determined through other sensing means, such as via the ranging system 106, structured light scan, manual entry, and so forth.

The ranging system 106 is also depicted as part of the sensor node 102. As described above, the ranging system 106 may utilize optical, acoustic, radio, or other range finding techniques and devices. The ranging system 106 may be configured to determine the distance, position, or both between objects, users, microphones 104, and so forth. For example, in one implementation the microphones 104 may be placed at various locations within the room and their precise position relative to one another determined using an optical range finder configured to detect an optical tag disposed upon each.

In another implementation, the ranging system 106 may comprise an acoustic transducer and the microphones 104 may be configured to detect a signal generated by the acoustic transducer. For example, a set of ultrasonic transducers may be disposed such that each projects ultrasonic sound into a particular sector of the room. The microphones 104 may be configured to receive the ultrasonic signals, or dedicated ultrasonic microphones may be used. Given the known location of the microphones relative to one another, active sonar ranging and positioning may be provided.

Figure 3:
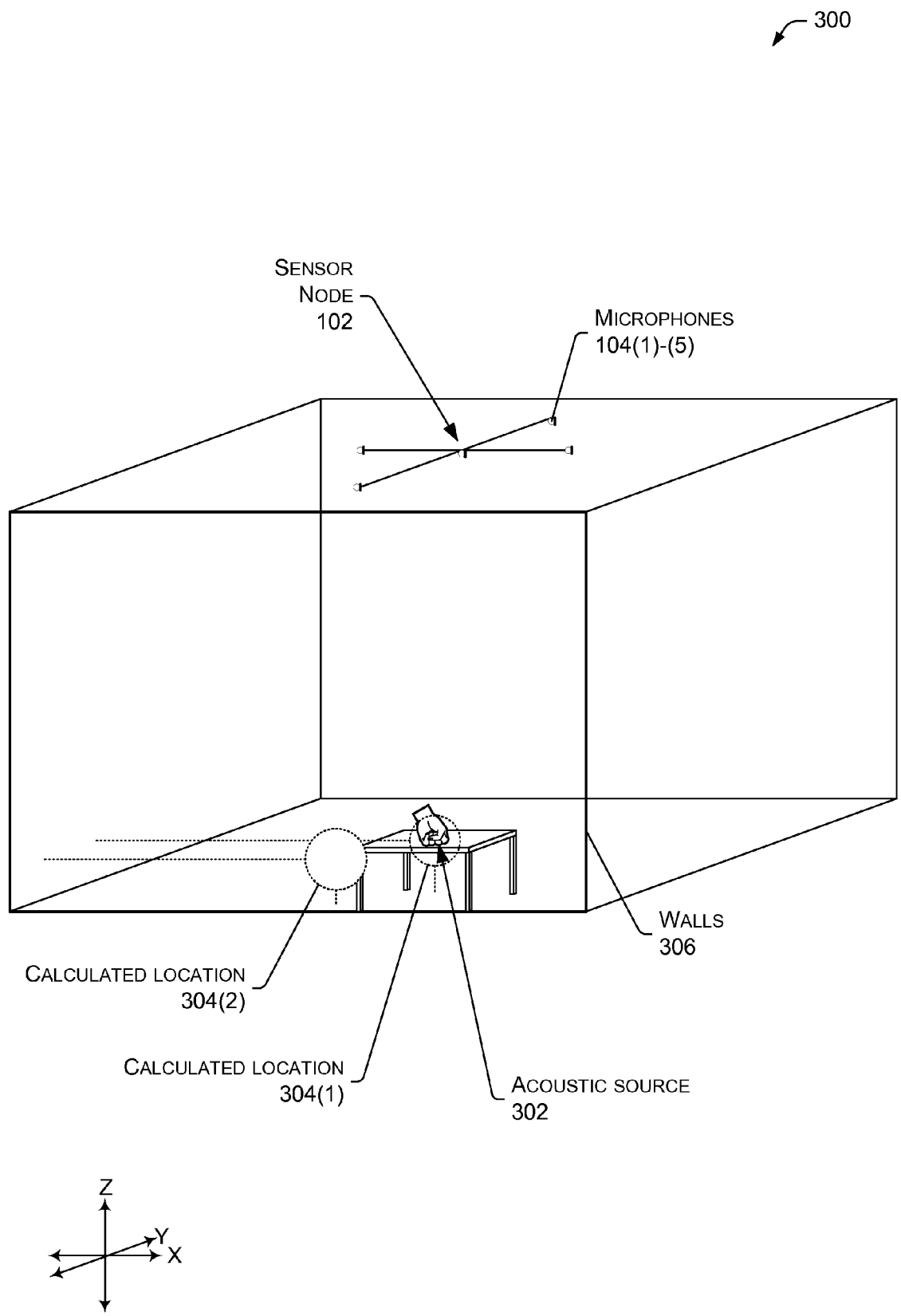
FIG. 3 depicts an illustrative room including an acoustic source and a calculated location for the acoustic source.

FIG. 3 depicts an illustrative volume 300 such as a room. In this illustration, the sensor node 102 is disposed on the ceiling while an acoustic source 302, such as a first knocking on a tabletop generates an acoustic signal. This acoustic signal propagates throughout the room and is received by the microphones 104. Data from the microphones 104 about the signal is then passed along via the input/output interface 114 to the TDOA estimate module 120 in the computing device 110. The TDOA estimate module 120 uses the data to generate TDOA values. However, because of environmental conditions such as noise, reverberation, and so forth, TDOA values may vary. The TDOA localization module 122 uses the TDOA values to calculate a location. Thus, when TDOA values are incorrect, the calculated location of the acoustic source is incorrect. For example, reverberations of the sound within the room may result in several acoustic signals having different time delays upon detection by the microphones in the sensor node 102. Determination based on these different acoustic signals having various time delays would result in displacement of calculated locations within the volume. A calculated location 304(1) using the methods and techniques described herein corresponds closely to the acoustic source 302 because the TDOA estimation avoids the effects of reverberations. In contrast, without the methods and techniques described herein, another calculated location 304(2) is erroneous due to reverberations of the acoustic signal from the tabletop, walls 306, floor, ceiling, and so forth.

Figure 4:
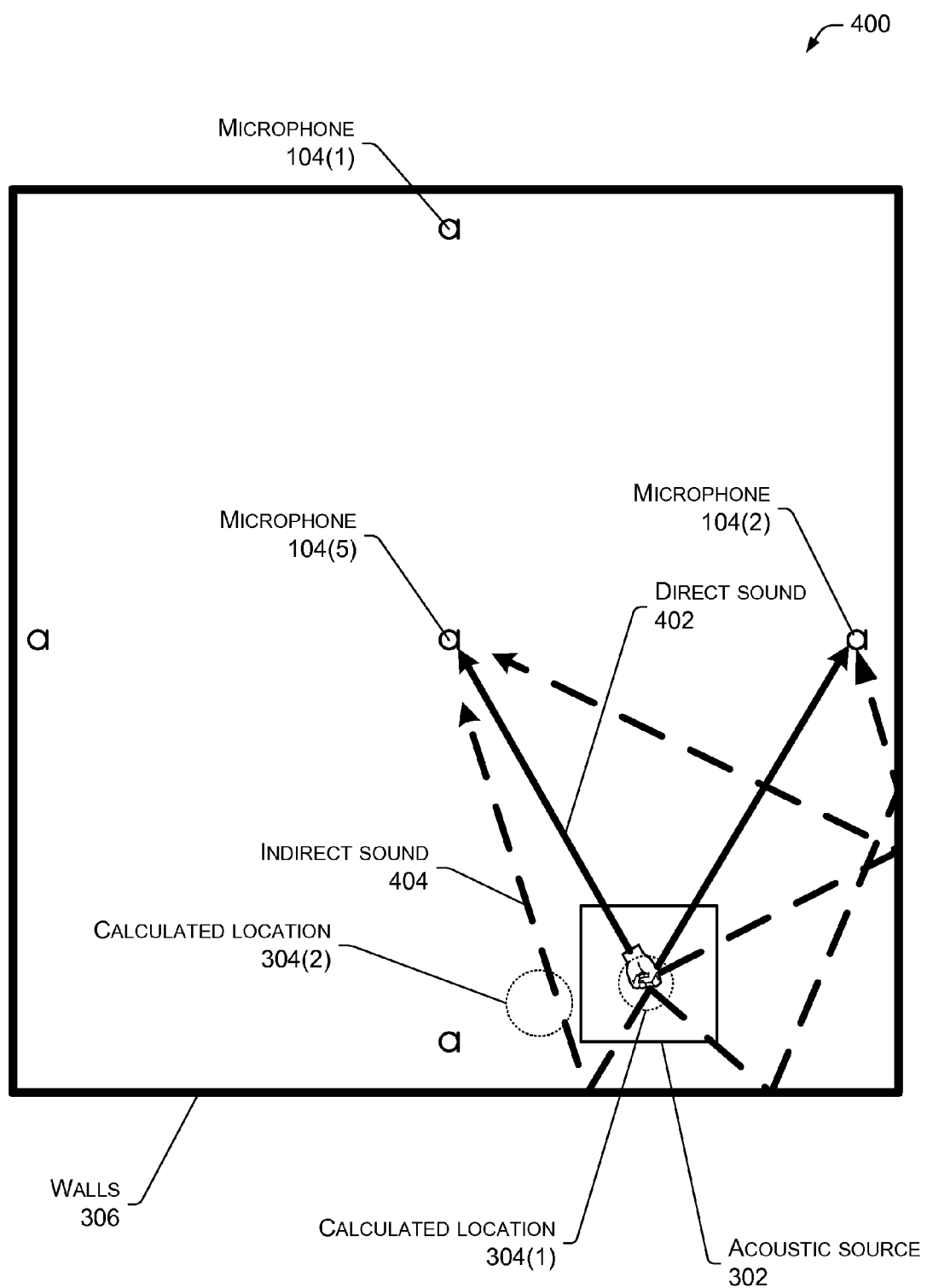
FIG. 4 depicts a plan view of the illustrative room of FIG. 3 showing direct and indirect sound.

FIG. 4 depicts a plan view 400 of the illustrative room of FIG. 3 showing direct and indirect sound. As described above, the acoustic source 302 generates the acoustic signal. This signal propagates outwards. Direct sound 402 is the signal resulting from a shortest non-obstructed path between the acoustic source 302 and the microphone 104. In contrast, indirect sound 404 as shown takes a longer path from the acoustic source 302 to the microphone. For example as shown here the indirect sound 404 is shown emanating from the acoustic source 302 and reflecting off of the walls 306 then towards the microphone 104(5). Because the indirect sound 404 follows a longer path, the indirect sound 404 signals arrive slightly later than the direct sound 402.

Figure 5:
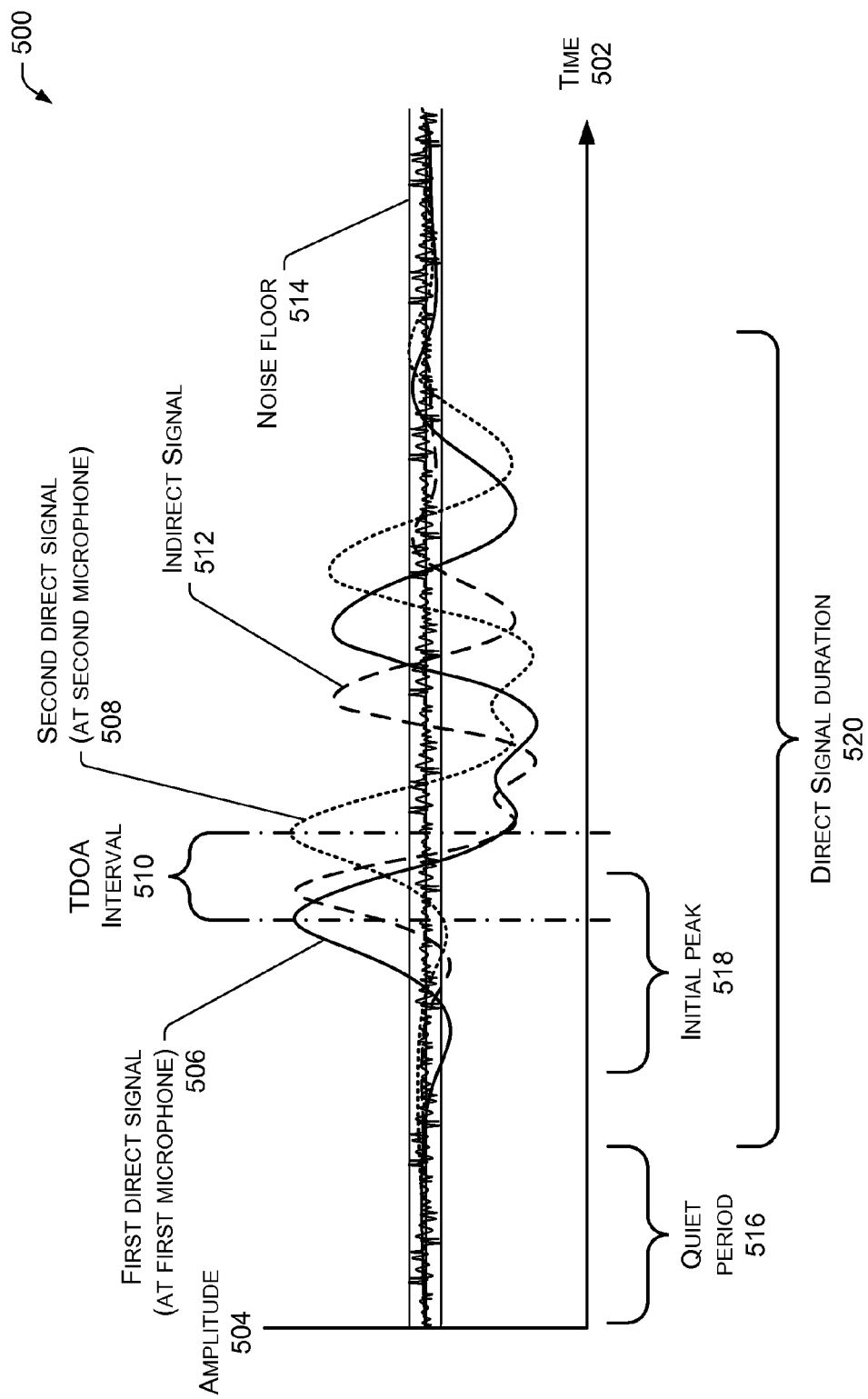
FIG. 5 is an illustrative graph of signals and corresponding reverberations.

FIG. 5 is an illustrative graph 500 of signals and corresponding reverberations. In this graph, a horizontal axis 502 indicates elapsed time while a vertical axis 504 indicates signal amplitude. Plotted over time are the amplitudes of two signals, each received at a different microphone. Two direct signals are shown here for ease of illustration, and not by way of limitation.

A first direct signal 506 which results from direct sound being received at a first microphone 104 is indicated by a solid line. A second direct signal 508 from the direct sound being received at a second microphone 104 is indicated with a dotted line. A time difference between a first peak of the first direct signal 506 and the second direct signal 508 is a time-difference-of-arrival interval 510. For example, this may be the time difference in receipt of the signal as compared between the central microphone 104(5) and another microphone such as 104(2). Other methods, including generalized cross correlation may also be used to determine the time-difference-of-arrival.

The graph 500 also illustrates that the microphones have picked up an indirect signal 512. A single indirect signal is shown here for ease of illustration and not by way of limitation. For example, in a small room with hard walls and floor, several indirect reverberating acoustic signals may be detected at the microphone 104. A signal received by the microphone 104 is a combination of these direct and indirect signals. As a result, amplitude of the received signal at any microphone 104 may be greater than or less than that of the direct signals which have not been interfered with by the indirect signals. For example, destructive interference may result in a direct signal with lower amplitude than the indirect signal at a particular microphone.

If the TDOA data were to be based on a received signal as corrupted by the indirect signal 512, an incorrect TDOA interval 510 may be determined. This incorrect TDOA interval would then lead to an incorrect localization of the signal.

The graph 500 also illustrates a noise floor 514 of the system. This noise floor may include ambient noise detected by the sensors. Where the sensors are microphones 104, this might include the sound of an air conditioning system, running motor in a refrigerator, external wind sounds, and so forth. The noise floor 514 may also include noise generated by operation of the sensing equipment, thermal noise in solid state devices, and so forth. In this context, signals may be considered meaningful when their amplitude exceeds that of the noise floor 514. The noise floor 514 may be static or dynamically adjustable.

The graph 500 further illustrates a quiet period 516 where signals from the sensors, if any, are at or below the noise floor 514. Continuing the example, the signal from the first direct signal 506 is shown in the quiet period 516, but during the quiet period 516 is below the noise floor 514. In some implementations, the quiet period 516 may vary from about 10 ms to about 150 ms.

As illustrated in this example, the acoustic source has generated a signal with amplitude which increases over time. Here, the initial peak 518 of the first direct signal 506 is shown where the amplitude of the signal exceeds the noise floor 514. As described below, the initial peak 518 of the first direct signal 506 and the second direct signal 508 may be separated from the peaks of the indirect signal 512. By measuring the TDOA interval 510 between direct signals, overall TDOA data quality is improved, improving accuracy of localization.

Overall duration of a direct signal 520 for one sensor is indicated. Some signals may be transient or sustained. A transient direct signal may have a duration of 250 milliseconds (ms) or less. Transient signals include taps of a user's fingers, a hand clap, individual footsteps, click, and so forth. Sustained signals extend for an overall duration in excess of the transient signals. In some instances, signals that last more than 250 ms may be deemed sustained signals, while signals less than this threshold may be deemed transient. Of course while one example duration threshold has been given, other embodiments may utilize any other threshold value. Sustained signals include human speech, whistles, breath noise, an audio beacon, and so forth.

Illustrative Processes

The following processes may be implemented by the architectures herein, or by other architectures. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. Furthermore, while the following process describes estimation of TDOA for acoustic signals, non-acoustic signals may be processed as described herein.

Figure 6:
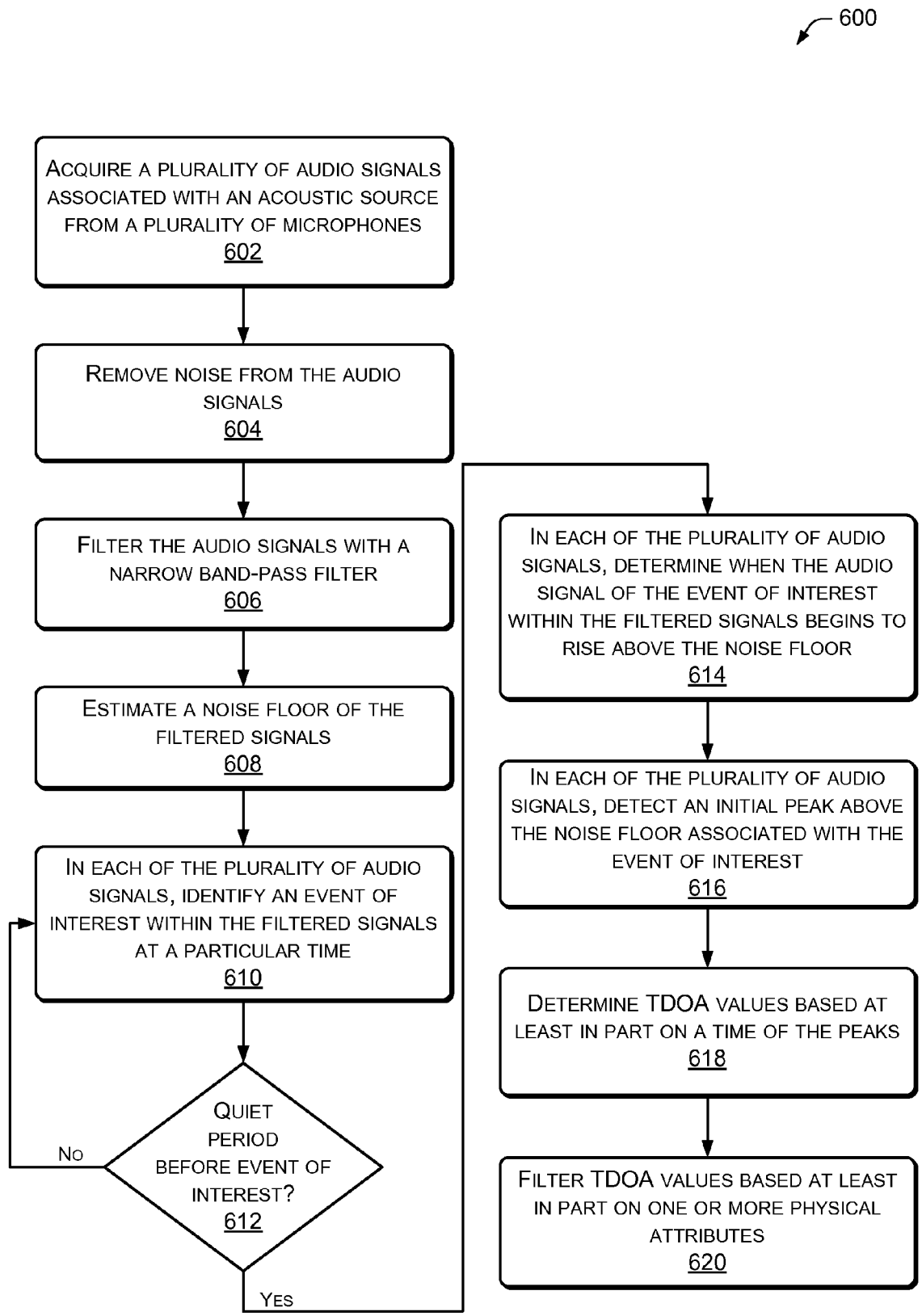
FIG. 6 is an illustrative process of determining TDOA based on direct sound from an acoustic source generating a transient signal.

FIG. 6 is an illustrative process 600 of determining direct sound from an acoustic source generating a transient signal. At 602, a plurality of audio signals associated with an acoustic source is acquired from a plurality of microphones. For example, microphones 104(1)-(5) in the room may gather audio signals from the acoustic source 302 of the user knocking on the table.

At 604, noise may be removed from the audio signals. Noise removal may take place using analog devices, digital processing, or a combination thereof. At 606, the audio signals are filtered with a narrow band-pass filter. For example, the band-pass filter may have a bandwidth extending from about 800 Hertz (Hz) to about 2 Kilohertz (KHz). In some implementations other band-pass filter bandwidths may be used. The bandwidth is selected to pass events of interest while removing unwanted frequency bands.

At 608, a noise floor of the filtered signals is estimated, either statically or dynamically. Static noise floor estimation may set a pre-determined noise floor level. In contrast, dynamic noise floor may be configured to track and adjust over time. In one implementation, an average-up/track down approach may be used, such that when the signal rises above the estimated noise floor, the noise floor is increased slowly but when the signal goes below the estimated noise floor, the noise floor may decrease more quickly. As a result, the noise floor may slowly rise and quickly fall.

At 610, an event of interest within the filtered signals is determined to occur at a particular time. For example, a sharp peak corresponding to part of the sound associated with a user tapping fingers on a table may be determined at time 150 milliseconds. In some implementations, a lookback may take place to determine where the signal exceeds the noise floor. In other situations, any signal having a signal-to-noise ratio (SNR) exceeding a pre-determined SNR may be designated as an event of interest.

At 612, when a quiet period exists before the event of interest, the process proceeds to 614. The quiet period may be static or dynamically adjusted, as described above. When no quiet period exists, the process may return to 610 and continue attempting to identify an event of interest.

At 614, a time when the signal of the event of interest begins to rise above the noise floor is determined. At 616, an initial peak associated with the signal corresponding to the event of interest which has exceeded the noise floor is detected. A pre-determined number or duration of the initial peaks corresponding to the direct sound may be selected. The pre-determined number or duration may be set statically or dynamically. For example, where set statically, in some implementations the first three peaks may be considered to be the direct sound. Later peaks, owing to the increased propagation time involved in the longer path lengths of indirect sound are disregarded.

At 618, TDOA values based at least in part on the first peak of a plurality of signals are determined. Being free from reverberation or other distorting signals, the TDOA values based on the direct sound are more accurate.

At 620, TDOA values are filtered based at least in part on one or more physical attributes. These physical attributes may include known locations of the microphones 104, dimensions of the room, temperature, atmospheric pressure, and so forth. For example, TDOA values corresponding to a location beyond the confines determined by the ranging system 106 may be filtered and removed.

Figure 7:
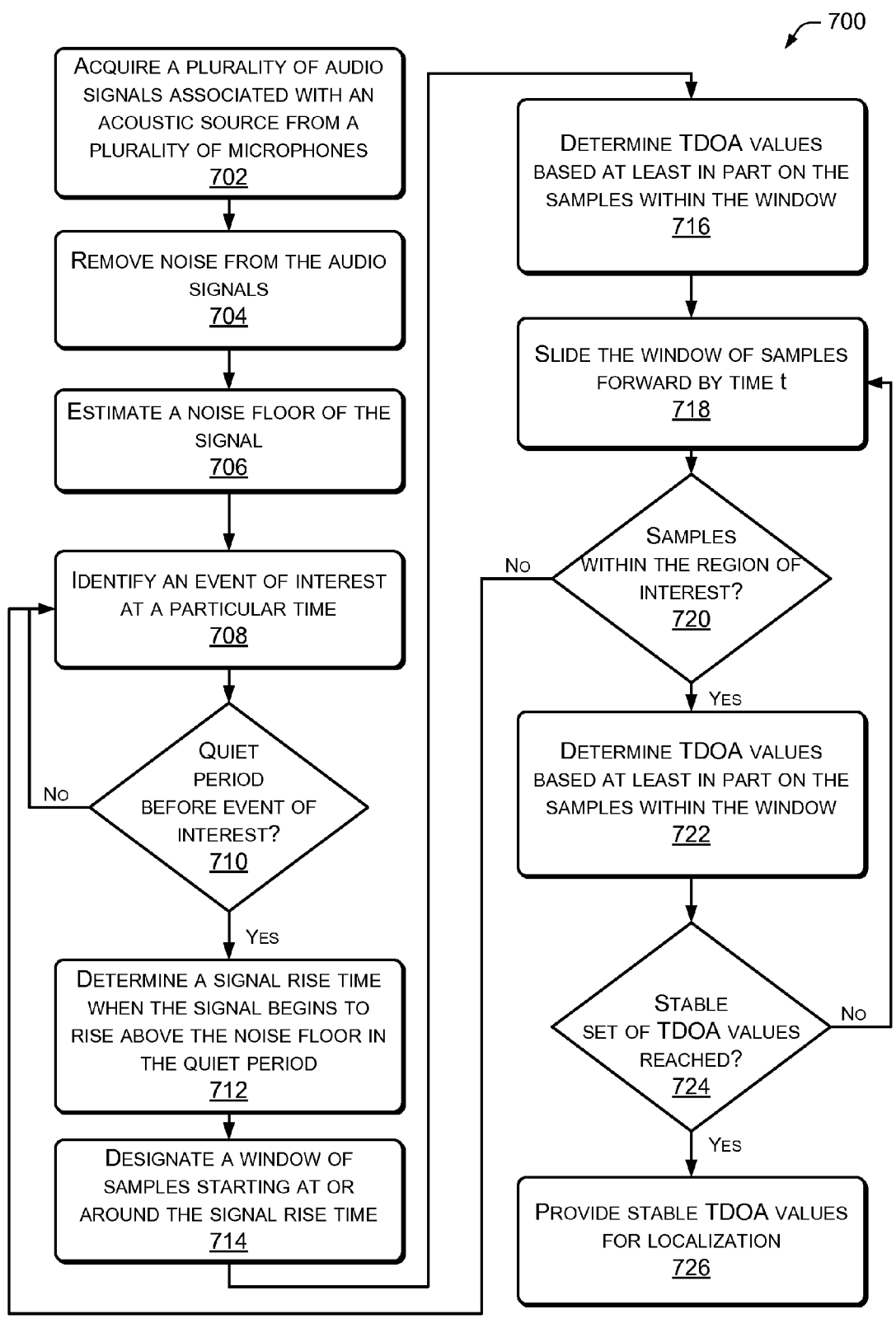
FIG. 7 is an illustrative process of determining TDOA based on direct sound from an acoustic source, such as human speech.

FIG. 7 is an illustrative process 700 of determining direct sound from a sustained acoustic source, such as human speech. Signal characteristics of human speech include sustained duration, variability in the frequency and time domains, low average power, and so forth. These characteristics have traditionally complicated tracking of human speech, particularly in an environment where indirect signals are present.

At 702, a plurality of audio signals associated with an acoustic source is acquired from a plurality of microphones. For example, microphones 104(1)-(5) in the room may gather audio signals from an acoustic source comprising the user speaking aloud.

At 704, noise may be removed from the audio signals. In some implementations a band-pass filter may be applied. For example, the band-pass filter may have a bandwidth extending from about 2 Kilohertz (KHz) to about 8 Kilohertz (KHz).

At 706, a noise floor of the signals is estimated, either statically or dynamically. Static noise floor estimation may set a pre-determined noise floor level. In contrast, the dynamic noise floor may be configured to track and adjust over time, such as described above.

At 708, an event of interest is identified at a particular time. For example, the event of interest may comprise the user speaking. This event of interest may be determined when a signal exceeds a pre-determined SNR.

At 710, when a quiet period exists before the event of interest, the process proceeds to 712. The quiet period may be static or dynamically adjusted, as described above. When no quiet period exists, the process may return to 708 and continue attempting to identify an event of interest.

At 712, a signal rise time is determined when the signal begins to rise above the noise floor of the quiet period. At 714, a time window of samples is designated starting at or around the signal rise time. At 716, a set of TDOA values based at least in part on the samples within the window is determined. At 718, the window of samples is slid forward by time t. For example, in some implementations the window may be advanced by about 2 milliseconds.

At 720, when the samples are within a region of interest which contains at least a portion of the direct signal, the process proceeds to 722. When the samples are not within the region of interest, the process may return to 708 and identify an event of interest at a particular time.

At 722, the TDOA values based at least in part on the samples within the now-slid window are determined. At 724, when a stable set of TDOA values among consecutive windows are reached, the process continues to 726. In some implementations a stable set of TDOA values may comprise four windows of TDOA values which are within 2% of one another. At 726, the stable TDOA values are provided for localization. When at 724 the TDOA values are not stable, that is they vary beyond a pre-determined threshold from one another, the process may return to 718 and continue sliding the window and calculating TDOAs. In some implementations, the entire process 700 may be iterated to provide for continuous tracking of a sustained audio source, such as a speaking user.

Figure 8:
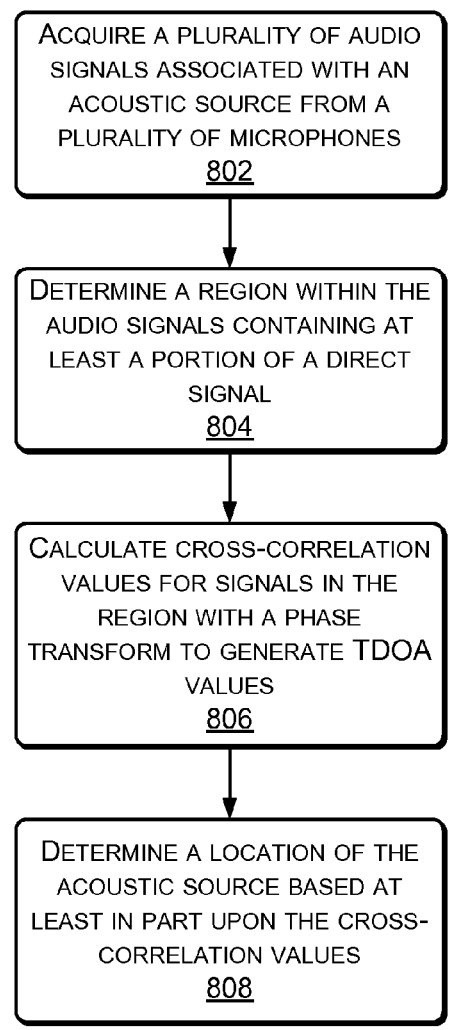
FIG. 8 is an illustrative process of determining direct sound and localizing the direct sound source.

FIG. 8 is an illustrative process 800 of determining direct sound and localizing the direct sound source. At 802, a plurality of audio signals associated with an acoustic source is acquired from a plurality of microphones. At 804, a region within the audio signals containing at least a portion of a direct signal is determined. As described above, this determination may comprise detecting when a signal rises above a noise floor following a quiet period. The direct signal comprises a signal generated by receipt of a sound from the acoustic source which is free from reflection.

At 806, cross-correlation values between the audio signals in the region are calculated with a phase transform (PHAT) to generate TDOA values. By confining the computation of the PHAT to the region of interest, computational requirements are reduced compared to continuous calculation of the entire signal.

At 808, a location of the acoustic source is determined based at least in part upon data resulting from the cross-correlation values of the region of interest. Because the TDOA data reflects the direct sound, degradation due to processing of reverberations is not present. As a result, the TDOA data is more accurate, leading to a more accurate localization.

CONCLUSION

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. One or more non-transitory computer-readable media storing computer-executable instructions that, when executed, cause one or more processors to perform acts comprising:
   acquiring, from a plurality of microphones, a plurality of audio signals associated with an acoustic source;
   filtering the plurality of audio signals with a band-pass filter;
   estimating a noise floor of the plurality of audio signals;
   for individual audio signals of the plurality of audio signals:
      identifying an event of interest;
      determining that the event of interest rises above the noise floor;
      adjusting the noise floor at a rate that is based at least partly on an extent to which the event of interest rises above the noise floor;
      detecting a peak after the event of interest rose above the noise floor; and
      determining a time at which the peak occurs; and
   determining time-difference-of-arrival (TDOA) values for the event of interest based at least in part on a difference between the time at which the peaks occur in the individual audio signals.

2. The one or more non-transitory computer-readable storage media of claim 1, wherein the band-pass filter is configured to have a bandwidth extending from about 800 Hertz to about 2 Kilohertz.

3. The one or more non-transitory computer-readable storage media of claim 1, wherein the event of interest comprises an acoustic signal having a duration of less than about 250 milliseconds.

4. The one or more non-transitory computer-readable storage media of claim 3, wherein the acoustic signal is generated by a human gesture.

5. The one or more non-transitory computer-readable storage media of claim 1, the acts further comprising removing noise from the plurality of audio signals.

6. The one or more non-transitory computer-readable storage media of claim 1, the acts further comprising filtering the TDOA values based at least in part on one or more physical attributes of the plurality of microphones or a room in which the plurality of microphones reside.

7. The one or more non-transitory computer-readable storage media of claim 6, wherein the physical attributes comprise known distances between the plurality of microphones.

8. The one or more non-transitory computer-readable storage media of claim 6, wherein the physical attributes comprise known dimensions of the room.

9. One or more non-transitory computer-readable media storing computer-executable instructions that, when executed, cause one or more processors to perform acts comprising:
   acquiring a plurality of audio signals associated with an acoustic source;
   for individual audio signals of the plurality of audio signals:
      identifying an event of interest by identifying a portion of the audio signal that corresponds to direct sound from the acoustic source and disregarding portions of the audio signal that correspond to indirect sound from the acoustic source;
      determining that the event of interest rises above a noise floor;
      detecting a peak after the event of interest rose above the noise floor; and
      determining a time at which the peak occurs; and
   determining time-difference-of-arrival (TDOA) values for the event of interest based at least in part on a difference between the time at which the peaks occur in the plurality of filtered audio signals.

10. The one or more non-transitory computer-readable storage media of claim 9, the acts further comprising filtering the plurality of audio signals with a band-pass filter.

11. The one or more non-transitory computer-readable storage media of claim 10, wherein the band-pass filter is configured to have a bandwidth extending from about 800 Hertz to about 2 Kilohertz.

12. The one or more non-transitory computer-readable storage media of claim 9, the acts further comprising estimating the noise floor of the plurality of audio signals.

13. The one or more non-transitory computer-readable storage media of claim 9, the acts further comprising removing noise from the plurality of audio signals.

14. The one or more non-transitory computer-readable storage media of claim 9, wherein the event of interest further comprises an acoustic signal generated by the acoustic source having a duration of less than about 250 milliseconds.

15. The one or more non-transitory computer-readable storage media of claim 14, wherein the acoustic signal is generated by a user physically striking an object within an environment.

16. The one or more non-transitory computer-readable storage media of claim 9, the acts further comprising filtering the TDOA values based at least in part on at least one of one or more physical attributes of a plurality of microphones receiving the plurality of audio signals or physical attributes of a room in which the plurality of microphones reside.

17. The one or more non-transitory computer-readable storage media of claim 16, wherein the physical attributes comprise known distances between the plurality of microphones.

18. The one or more non-transitory computer-readable storage media of claim 16, wherein the physical attributes comprise known dimensions of the room.

19. A system comprising:
   a plurality of sensors;
   a time-difference-of-arrival module coupled to the sensors and configured to:
      acquire, via the sensors, a plurality of signals associated with an acoustic source;
      for individual audio signals of the plurality of signals:
         identify an event of interest;
         determine that the event of interest rises above a noise floor;
         based at least partly on the event of interest rising above the noise floor, increase the noise floor at a first rate;
         determine that the event of interest falls below the noise floor; and
         based at least partly on the event of interest falling below the noise floor, decrease the noise floor at a second rate different from the first rate.

20. The system of claim 19, wherein the plurality of sensors comprise one or more microphones.

21. The system of claim 19, the time-difference-of-arrival module being further configured to:
   filter the plurality of signals with a band-pass filter; and
   estimate the noise floor of the plurality of signals.

22. The system of claim 19, wherein the time-difference-of-arrival module is further configured to:
- detect a peak after the event of interest rose above the noise floor;
- determine a time at which the peak occurs;
- determine time-difference-of-arrival (TDOA) values based at least in part on a difference between the time at which the peaks of the signals occur; and
- localize the source based at least in part upon the determined TDOA values.

23. One or more non-transitory computer-readable media storing computer-executable instructions that, when executed, cause one or more processors to perform acts comprising:
- acquiring, from a plurality of microphones, a plurality of audio signals associated with an acoustic source generated by a human speaker;
- estimating a noise floor of the plurality of audio signals; and
- for individual audio signals of the plurality of audio signals:
  - identifying an event of interest that comprises human speech;
  - determining a time that the event of interest rises above the noise floor;
  - designating a window of samples starting within a threshold amount of time from the time that the event of interest rises above the noise floor; and
  - adjusting the noise floor at a rate that is based at least partly on an extent to which the event of interest rises above the noise floor.

24. The one or more non-transitory computer-readable storage media of claim 23, the acts further comprising determining that a quiet period is present before the event of interest, wherein the quiet period is less than about 100 milliseconds in duration.

25. The one or more non-transitory computer-readable storage media of claim 23, the acts further comprising determining that a quiet period is present before the event of interest, wherein the quiet period comprises a period during which any audio signals are at or below the noise floor.

26. The one or more non-transitory computer-readable storage media of claim 23, wherein the window of samples is less than about 2 milliseconds in duration.

27. The one or more non-transitory computer-readable storage media of claim 23, the acts further comprising filtering the plurality of audio signals with a band-pass filter configured to have a bandwidth extending from about 2 Kilohertz to about 8 Kilohertz.

28. The one or more non-transitory computer-readable storage media of claim 23, the acts further comprising removing noise from the plurality of audio signals.

29. The one or more non-transitory computer-readable storage media of claim 23, the acts further comprising:
- calculating time-difference-of-arrival (TDOA) values based at least in part on samples within the window of samples;
- sliding the window of samples forward by a time, t;
- determining that the samples are within a region of interest that comprises at least a portion of a direct signal from the event of interest; and
- again calculating TDOA values based at least in part upon the samples within the window after sliding the window forward by the time, t.

30. The one or more non-transitory computer-readable storage media of claim 29, the acts further comprising filtering the TDOA values based at least in part on at least one of one or more physical attributes of the plurality of microphones or of a room in which the plurality of microphones reside.

31. The one or more non-transitory computer-readable storage media of claim 30, wherein the physical attributes comprise known distances between the plurality of microphones.

32. The one or more non-transitory computer-readable storage media of claim 30, wherein the physical attributes comprise known dimensions of the room.

33. The one or more non-transitory computer-readable storage media of claim 23, the acts further comprising:
- based at least partly on a determination that a stable set of TDOA from a pre-determined number of consecutive windows values is reached, localizing the acoustic source with use of the stable TDOA values.

34. The one or more non-transitory computer-readable storage media of claim 23, the acts further comprising continuously tracking the acoustic source.

35. The one or more non-transitory computer-readable storage media of claim 23, wherein identifying the event of interest that comprises human speech includes identifying a portion of the audio signal that corresponds to direct sound traveling directly from the acoustic source and disregarding portions of the audio signal that correspond to indirect sound traveling indirectly from the acoustic source.

36. One or more non-transitory computer-readable media storing computer-executable instructions that, when executed, cause one or more processors to perform acts comprising:
- acquiring, from a plurality of microphones, a plurality of audio signals associated with an acoustic source, wherein a portion of an audio signal of the plurality of audio signals is indicative of direct sound traveling directly from the acoustic source and portions of the audio signal are indicative of indirect sound traveling indirectly from the acoustic source;
- calculating a time-difference-of-arrival value for the audio signal at least partly by disregarding the portions of the audio signal that are indicative of the indirect sound; and
- determining a location of the acoustic source based at least in part upon the time-difference-of arrival value; and
- for an audio signal of the plurality of audio signals:
  - estimating a noise floor of the audio signal;
  - identifying an event of interest that comprises human speech; and
  - adjusting the noise floor at a rate that is based at least partly on an extent to which the event of interest rises above the noise floor.

37. The one or more non-transitory computer-readable storage media of claim 36, wherein the portion of the audio signal that is indicative of the direct sound is received from the acoustic source free from reflection.

38. The one or more non-transitory computer-readable storage media of claim 36, wherein the calculating comprises applying a phase transform.

39. The one or more non-transitory computer-readable storage media of claim 36, wherein the calculating comprises applying a generalized cross correlation technique.

40. The one or more non-transitory computer-readable storage media of claim 36, wherein the determining the location further comprises filtering the time-difference-of-arrival value based at least in part upon one or more physical attributes of at least one of the plurality of the microphones or of a room in which the plurality of microphones reside.

41. The one or more non-transitory computer-readable storage media of claim 40, wherein the physical attributes comprise known distances between the plurality of microphones.

42. The one or more non-transitory computer-readable storage media of claim 40, wherein the physical attributes comprise known dimensions of the room.

43. A system comprising:
a plurality of sensors;
a time-difference-of-arrival module coupled to the sensors and configured to:
  acquire, from a plurality of sensors, a plurality of audio signals associated with an acoustic source generated by a human speaker;
  for individual ones of the plurality of the audio signals:
    identify an event of interest that comprises human speech;
    determine a time that the event of interest rises above a noise floor; and
    adjusting the noise floor at a rate that is based at least partly on an extent to which the event of interest rises above the noise floor.

44. The system of claim 43, wherein the sensors comprise microphones.

45. The system of claim 43, wherein the event of interest comprises a portion of an audio signal that is received directly by a microphone free from reflection.

46. The system of claim 43, the time-difference-of-arrival module further configured to:
  filter the plurality of audio signals with a band-pass filter; and
  estimate the noise floor of the plurality of audio signals.

47. The system of claim 43, further comprising a wherein the time-difference-of-arrival module is further configured to:
  determine that a quiet period is present before the event of interest;
  designate a window of samples starting within a threshold amount of time from the time that the event of interest rises above the quiet period;
  calculate time-difference-of-arrival (TDOA) values based at least in part on samples within the window of samples;
  slide the window of samples forward by a time, t;
  determine that the samples are within a region of interest that comprises at least a portion of a direct signal from the event of interest;
  again calculate TDOA values based at least in part upon the samples within the window of samples after sliding the window forward by the time, t; and
  localize the acoustic source based at least in part upon the calculated TDOA values.

\* \* \* \* \*